Jan. 8, 1952  A. Y. CROWLEY, JR., ET AL  2,582,106
MATERIAL HANDLING MACHINE
Filed July 9, 1948  4 Sheets-Sheet 1
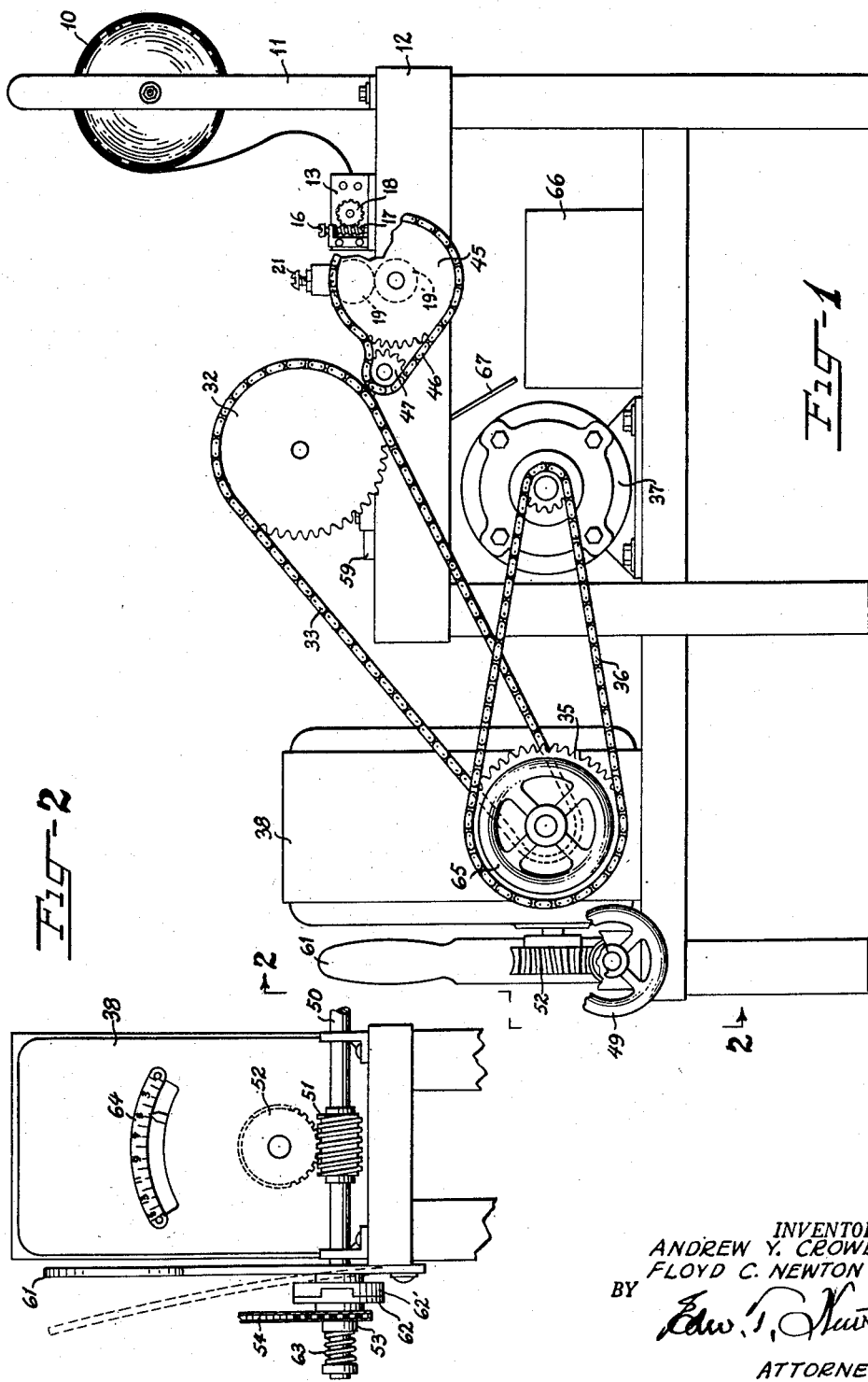
INVENTORS
ANDREW Y. CROWLEY JR.
FLOYD C. NEWTON JR.
BY
Edw. T. Newton
ATTORNEY Jan. 8, 1952  A. Y. CROWLEY, JR., ET AL  2,582,106
MATERIAL HANDLING MACHINE
Filed July 9, 1948  4 Sheets-Sheet 2
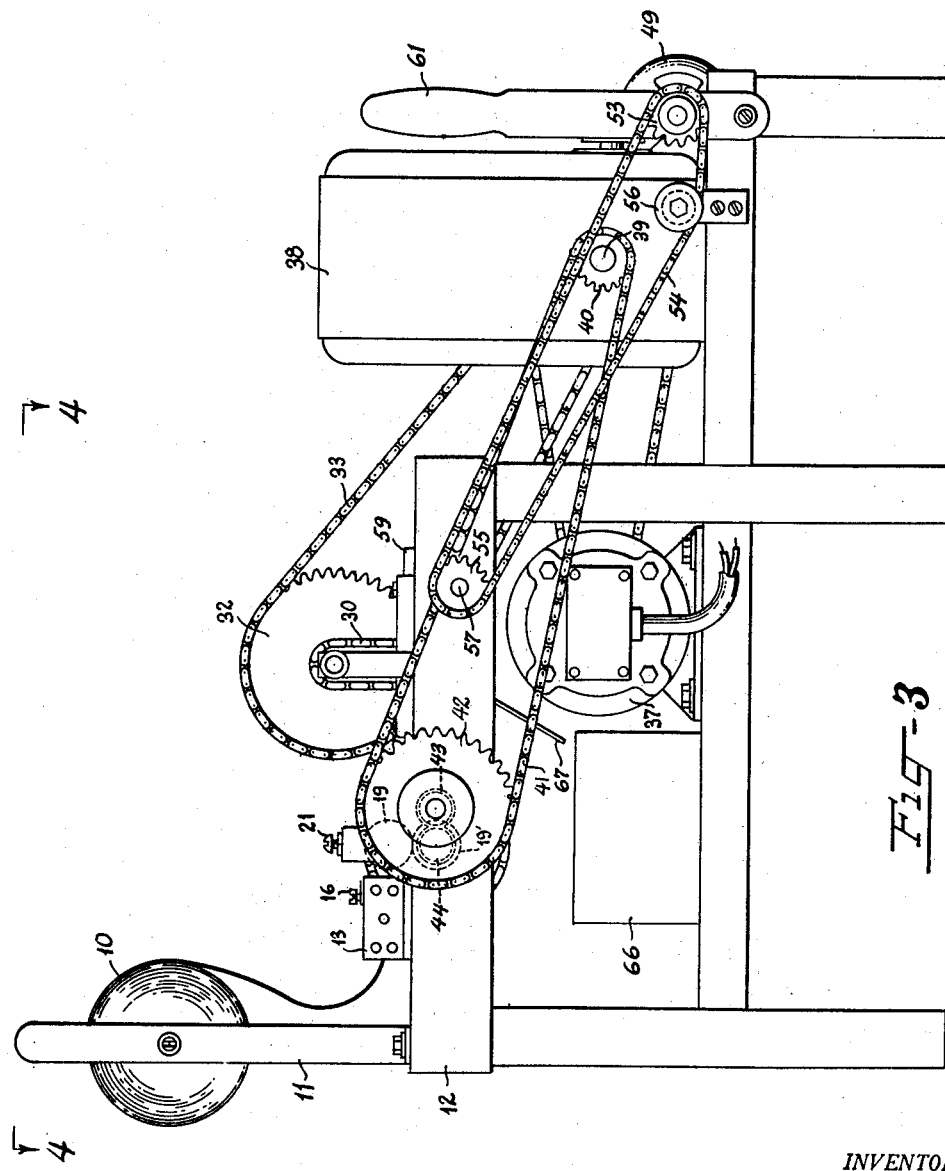
INVENTORS
ANDREW Y. CROWLEY JR
FLOYD C. NEWTON JR.
BY
Edw. T. Newton
ATTORNEY

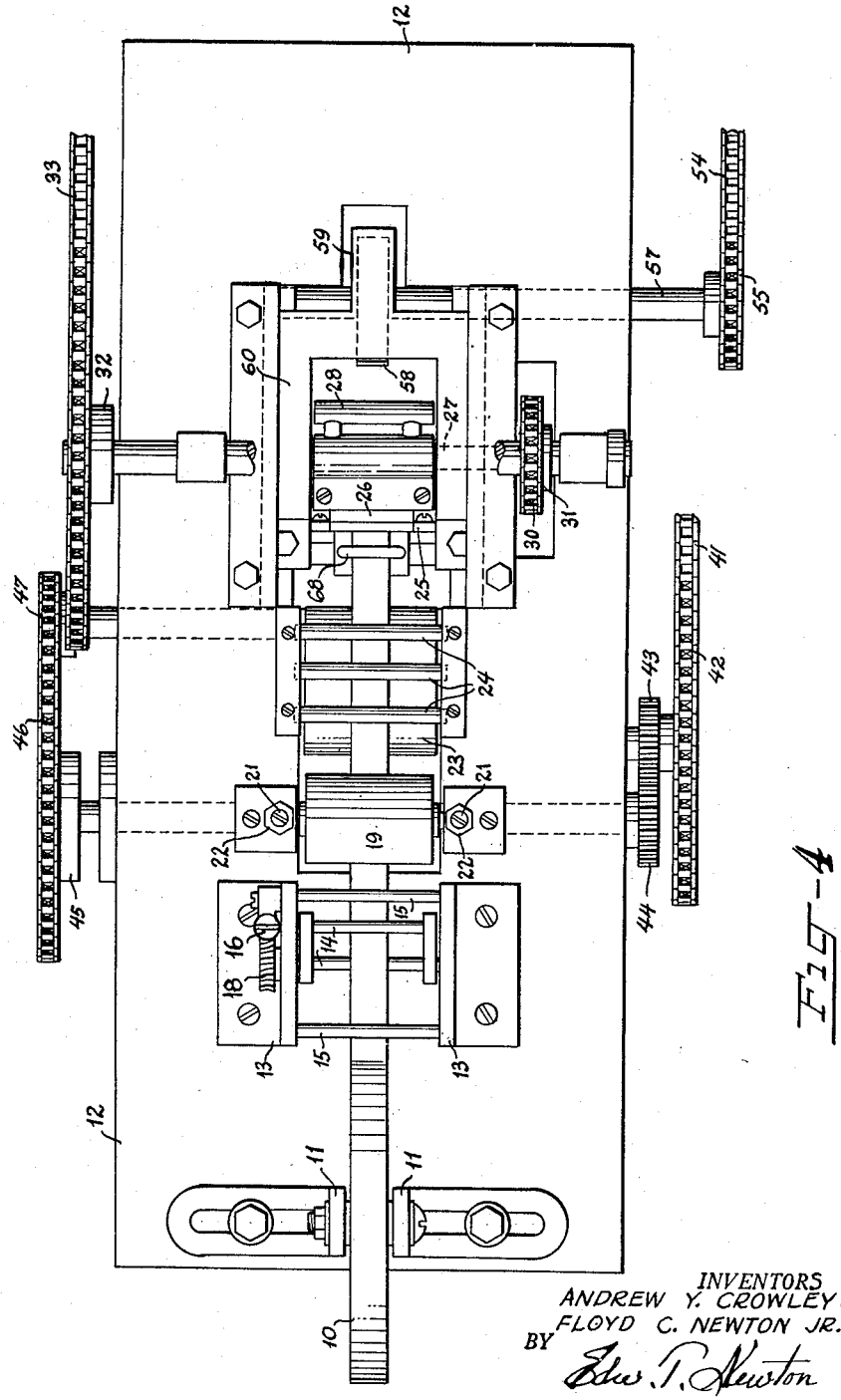

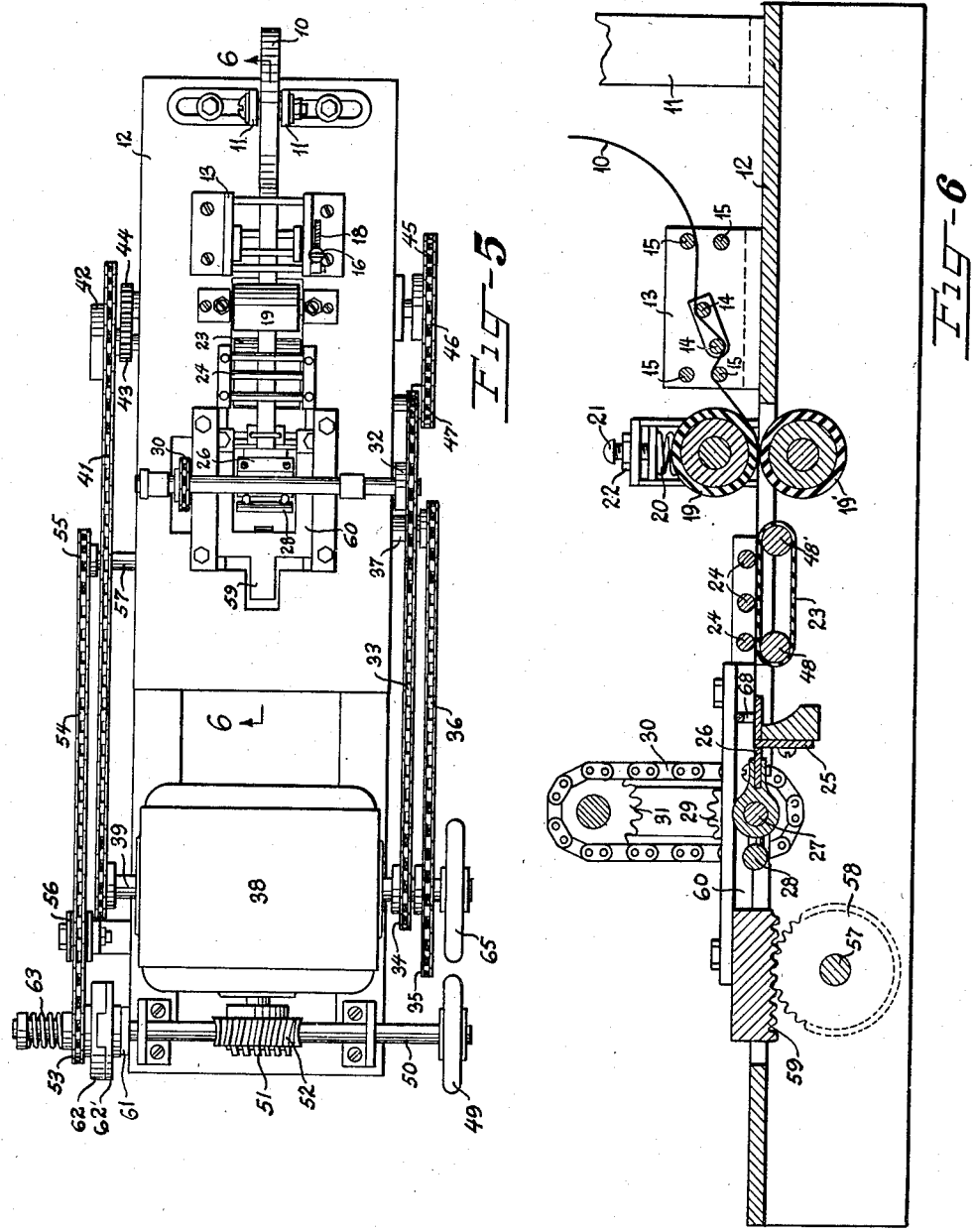

Patented Jan. 8, 1952

2,582,106

UNITED STATES PATENT OFFICE 2,582,106

MATERIAL HANDLING MACHINE

Andrew Y. Crowley, Jr., and Floyd C. Newton, Jr., Griffin, Ga.

Application July 9, 1948, Serial No. 37,864

15 Claims. (Cl. 164—68)

This invention relates to a material handling machine and more particularly to a machine for cutting sheet or strip material into shorter lengths. The machine finds especial use where the material to be cut is manufactured or supplied in rolls or strips made up of pre-marked units, and particularly where such material has minor differences in the length of the units because of variations in tension, elasticity, construction, or other factors, and where there are major differences in the length of a unit or units resulting from imperfections or overlap in construction, preparation, joining of the ends of strips or other causes, and particularly to accommodate the cutting of units previously made in widely different lengths.

According to our invention a machine is provided for accommodating a roll or strip of material made up of pre-marked units and cutting it into individual units automatically yet under the complete control of the operator who can merely turn a single hand wheel and regulate the exact position where the cut is made between any two adjacent units while the machine is in operation.

It is well known that units in any strip vary in length due to variations in the manufacturing processes, to changes in atmospheric conditions, to variations in the moisture content or elasticity of the materials and various other changes and conditions to which they are subjected or which are inherent characteristics of the material. Attempts heretofore made to provide a machine of this character for cutting such material to the close tolerances required have proved unsuccessful. Our machine is useful in cutting materials of various sorts including fabric, metal, wood, plastic and other materials of similar properties as will be well understood.

It is an object of our invention to provide a material handling machine which is readily adjustable while in operation to cut sheet or strip material into previously marked shorter lengths within close tolerances.

Another object of our invention is to provide a material handling machine which will cut sheet or strip material into shorter lengths and which is readily adjustable to make cuts of widely varying major spacing as well as to govern the exact position of cuts to accommodate minor variations in the material being handled.

Another object of our invention is to provide a material handling machine in which the distance between the feed mechanism and the cutting mechanism may be changed simultaneously with a change in the speed of operation of one of those mechanisms, and in which the change may be made while the machine is in operation.

Another object of our invention is to provide a material handling machine having feed mechanism and cutting mechanism in which the speed of one of said mechanisms is variable and means are provided for changing the distance between said mechanisms simultaneously with a change in speed in said variable speed mechanism.

Another object of our invention is to provide a material handling machine having feed mechanism and cutting mechanism in which the speed of operation of one of said mechanisms is variable and means are provided for selectively changing or not changing the distance between said mechanisms upon a change in speed in said variable speed mechanism.

Another object of our invention is to provide a material handling machine of the class described which is simple and rugged in construction, easy and inexpensive to manufacture, and accurate and efficient in operation.

Other and further objects and advantages of our invention will be apparent from the following description taken in connection with the accompanying drawing in which like characters of reference designate corresponding parts throughout the several views, and wherein:

Fig. 1 is a side view of the machine.

Fig. 2 is an end view taken along the line 2—2 in Fig. 1.

Fig. 3 is a side view from the side opposite that shown in Fig. 1.

Fig. 4 is an enlarged fragmentary plan view taken along the line 4—4 in Fig. 3.

Fig. 5 is a plan view of the complete machine.

Fig. 6 is a cross-sectional view taken along the line 6—6 in Fig. 5.

In our material handling machine, which may be adapted for strips or sheets of material of various widths, a roll of material 10 is rotatably mounted on supports 11 carried by a platform 12. The material is fed from the roll through tension mechanism 13 to straighten it out.

The tension mechanism comprises a pair of movable bars 14 flanked on either side by a pair of stationary bars 15. The movable bars 14 are arranged to be swung about the axis of one of these bars by means of an adjusting screw 16 which operates a worm gear 17 in engagement with gear 18 mounted on the axle carrying one of the movable bars 14. The material passes between the first set of fixed bars 15, then between the movable bars 14, and then between the second set of fixed or stationary bars 15, as shown in detail in Fig. 6.

From the tension or straightening mechanism 13 the material passes between a pair of feed rolls 19, 19' which are pressed together by means of springs 20 in which the tension may be adjusted by screws 21 which are arranged to be held in any desired position by lock nuts 22.

From the feed rolls 19, 19', the material passes onto a conveyor belt 23, where it is held in place by guide rolls 24, and it passes thence onto the cutting bar 25 where it is cut by the rotating knife blade 26. The knife blade 26 is mounted for rotation on shaft 27 and is counterbalanced at 28 for smooth operation. The cutting bar 25 and the knife blade 26 are individually replaceable, being held in position by screws, as shown.

In the embodiment shown, the rotating cutting blade 26 is driven at constant speed by sprocket wheel 29 which is mounted on shaft 27 and is connected by chain 30 to sprocket wheel 31 which is mounted on the same shaft as sprocket 32 which is connected by chain 33 to sprocket 34 which is mounted on the same shaft as sprocket 35 which is connected by chain 36 to the electric motor 37.

Motor 37 also drives a variable speed drive mechanism 38 which is of ordinary and well known manufacture and no claim is made to the particular construction thereof. The output shaft 39 of the variable speed drive mechanism 38 carries a sprocket 40 which is connected by chain 41 to sprocket 42 which drives the gear 43 in mesh with the gear 44. The gear 44 is mounted on the same shaft as feed roll 19' and drives the feed rolls at any selected speed.

Sprocket 45 is also mounted on the same shaft as feed roll 19' and is connected by chain 46 to sprocket 47. Conveyor belt 23 runs over rollers 48, 48'. Sprocket 47 is mounted on the same shaft as roller 48 and thereby drives the conveyor belt 23 at a speed which is directly related to the speed of the feed rolls 19, 19'. The relative size of the sprockets 45 and 47 may be chosen so that the speed of the conveyor belt 23 is somewhat faster than the peripheral speed of the feed rolls 19, 19' in order to obviate any tendency of the material to buckle and to assure steady feeding of the material onto the cutting bar 25.

To vary the speed of the feed rolls 19, 19' it is only necessary to turn the hand wheel 49 which controls the variable speed drive mechanism 38. Hand wheel 49 is mounted on shaft 50 which carries worm gear 51 in mesh with gear 52 mounted on the control shaft of the variable speed drive mechanism 38. Shaft 50 also carries sprocket 53 which is connected by chain 54 to sprocket 55. Idle roller 56 may be used to regulate the tension in chain 54, as desired. Sprocket 55 is mounted on shaft 57 which carries pinion gear 58 in mesh with the rack 59 secured to the movable platform 60 which carries both the rotating knife blade 26 and the cutting bar 25, and is mounted for movement longitudinally of the stationary platform 12. By this arrangement, by rotating the hand wheel 49 in a direction to slow down the speed of the output shaft of the variable speed drive mechanism 38, the operator simultaneously moves the platform 60, carrying the rotating knife blade 26 and the cutting bar 25, longitudinally of the platform 12 and farther away from the feed rolls 19, 19'; and vice versa, rotation of the hand wheel 49 in the opposite direction serves simultaneously to increase the speed of the output shaft of the variable speed drive mechanism and to move the cutter bar and rotating knife blade closer to the feed rolls. These adjustments can be made while the machine is in operation.

In the foregoing described manner, the machine is adjusted to compensate for minor variations in the length of pieces of material to be cut off. In order to make a major adjustment in the speed of the rotating knife blade, the handle 61 is provided to disengage clutch plates 62, 62', which are normally held in contact by spring 63, so as to permit operation of hand wheel 49 without turning pulley 53. When the clutch plates 62, 62' are disengaged, hand wheel 49 may be turned to rotate worm gear 51 and gear 52, mounted on the control shaft of the variable speed drive mechanism 38, so as to change the speed of the output shaft of the variable speed drive mechanism, the particular speed setting chosen being indicated on the scale 64.

A hand wheel 65 may be provided, if desired, on the input shaft of the variable speed drive mechanism, for example, to assist in moving the apparatus in threading the machine and the like. Also, a receptacle 66 for the material cut off may be provided, as shown in Fig. 1, and an inclined chute 67 may be used to direct the material into the receptacle. Guide bars 68 may be placed along the path of the material, as desired, to assure straight feeding.

In the operation of our machine, immediate adjustment of the location of the cut can be made while the machine is in operation by simply rotating the hand wheel 49. This operation is characterized by three distinct features, namely: it changes the relative speeds of the feeding mechanism and the cutting mechanism; it changes the distance between the feeding mechanism and the cutting mechanism; and it makes both of the above stated changes simultaneously.

It will, of course, be obvious that the relative speeds of the feeding mechanism and the cutting mechanism can be changed by changing the speed of either or both of said mechanisms, and that the distance between said mechanisms can be changed by changing the position of either or both of said mechanisms. Many modifications and arrangements will be suggested to those skilled in the art by this disclosure, and all such modifications and adaptations can be made without departing from the scope of our invention as defined in the appended claims.

We claim:

1. A machine of the character described having in combination feed rollers for feeding material to be cut into shorter lengths, tension mechanism comprising sets of fixed and movable bars, respectively, through which said material passes for straightening it, means for adjusting said movable bars, cutter means comprising a rotating cutter blade and a cutter bar, said cutter means being mounted upon a movable platform, means for adjusting the position of said movable platform with respect to said feed rollers, a conveyor belt for passing the material from said feed rollers to said cutter means, electric motor means for driving said feed rollers, conveyor belt and cutter blade, said cutter blade being driven at constant speed, said conveyor belt being driven at a speed faster than the peripheral speed of said feed rollers, means for simultaneously adjusting the speed of said feed rollers and adjusting the position of said cutter means with respect to said feed rollers while said machine is in operation, and selectively operable clutch means for disengaging said means for adjusting the position of said movable platform whereby the speed of said feed rollers may be changed without changing the position of said movable platform and the cutter means carried thereby.

2. A machine of the character described having in combination feed mechanism for feeding material to be cut into shorter lengths, tension mechanism through which said material passes for straightening it, cutter means comprising a rotating cutter blade and a cutter bar, said cutter means being mounted upon a movable platform, means for adjusting the position of said movable platform with respect to said feed mechanism, a conveyor belt for passing the material from said feed mechanism to said cutter means, means for driving said feed mechanism, conveyor belt and cutter blade, said cutter blade being driven at constant speed, said conveyor belt being driven at a speed faster than the feeding speed of said feed mechanism, means for simultaneously adjusting the speed of said feed mechanism and adjusting the position of said cutter means with respect to said feed mechanism while said machine is in operation, and selectively operable clutch means for disengaging said means for adjusting the position of said movable platform whereby the speed of said feed mechanism may be changed without changing the position of said movable platform and the cutter means carried thereby.

3. A machine of the character described having in combination feed mechanism for feeding material to be cut into shorter lengths, cutter means comprising a rotating cutter blade and a cutter bar, said cutter means being mounted upon a movable platform, means for adjusting the position of said movable platform with respect to said feed mechanism, a conveyor belt for passing the material from said feed mechanism to said cutter means, means for driving said feed mechanism, conveyor belt and cutter blade, said cutter means being driven at constant speed, said conveyor belt being driven at a speed faster than the feeding speed of said feed mechanism, means for simultaneously adjusting the speed of said feed mechanism and adjusting the position of said cutter means with respect to said feed mechanism while said machine is in operation, and selectively operable means for disengaging said means for adjusting the position of said movable platform whereby the speed of said feed mechanism may be changed without changing the position of said movable platform and the cutter means carried thereby.

4. A machine of the character described having in combination feed mechanism for feeding material to be cut into shorter lengths, cutter means including a cutter blade, said cutter means being mounted upon a movable platform, means for adjusting the position of said movable platform with respect to said feed mechanism, a conveyor for passing the material from said feed mechanism to said cutter means, means for driving said feed mechanism, conveyor and cutter blade, means for simultaneously adjusting the speed of said feed mechanism and adjusting the position of said cutter means with respect to said feed mechanism while said machine is in operation, and selectively operable means for disengaging said means for adjusting the position of said movable platform whereby the speed of operation of said feed mechanism may be changed without changing the position of said movable platform and the cutter means carried thereby.

5. A machine of the character described having in combination feed mechanism for feeding material to be cut into shorter lengths, cutter means including a cutter blade to which said material is fed, said cutter means being mounted upon a movable platform, means for adjusting the position of said movable platform with respect to said feed mechanism, means for driving said feed mechanism and said cutter blade, means for simultaneously adjusting the operating speed of said feed mechanism and adjusting the position of said cutter means with respect to said feed mechanism while said machine is in operation, and selectively operable means for disengaging said means for adjusting the position of said movable platform whereby the speed of said feed mechanism may be changed without changing the position of said movable platform and the cutter means carried thereby.

6. In a machine of the character described, the combination of feed mechanism for feeding material to be cut into shorter lengths, cutter means including a cutter blade to which said material is fed, means for adjusting the position of said cutter means with respect to said feed mechanism, means for driving said feed mechanism and said cutter blade, and means for simultaneously adjusting the operating speed of said feed mechanism and adjusting the position of said cutter means with respect to said feed mechanism while the machine is in operation.

7. In a machine of the character described, the combination of feed mechanism for feeding material to be cut into shorter lengths, cutter means including a cutter blade to which said material is fed, means for adjusting the position of said cutter means with respect to said feed mechanism, means for driving said feed mechanism and said cutter blade, means for simultaneously adjusting the operating speed of said feed mechanism and adjusting the position of said cutter means with respect to said feed mechanism while the machine is in operation, and selectively operable means for disengaging said means for adjusting the position of said cutter means whereby the speed of said feed mechanism may be changed without changing the position of said cutter means.

8. In a machine of the character described, the combination of feed mechanism for feeding material to be cut into shorter lengths, cutter means including a cutter blade to which said material is fed, means for adjusting the distance between said feed mechanism and said cutter means, means for driving said feed mechanism and said cutter blade, and means for simultaneously adjusting the operating speed of said feed mechanism and adjusting the distance between said feed mechanism and said cutter means while the machine is in operation.

9. In a machine of the character described, the combination of means for feeding material to be cut into shorter lengths, cutter means including a cutter blade to which said material is fed, means for adjusting the distance between said means for feeding and said cutter means, means for driving said means for feeding and said cutter means, one of said means being driven at constant speed, means for simultaneously adjusting the operating speed of the other of said means and the distance between said means for feeding and said cutter means while the machine is in operation, and selectively operable means for disengaging said means for adjusting the distance between said means for feeding and said cutter means whereby the speed ratio between said cutter blade and said means for feeding may be changed without changing the distance between said means for feeding and said cutter means.

10. In a machine of the character described, the combination of means for feeding material to be cut into shorter lengths, cutter means including a cutter blade to which said material is fed, means for adjusting the distance between said means for feeding and said cutter means, means for driving said means for feeding and said cutter means, one of said means being driven at constant speed, means for simultaneously adjusting the operating speed of the other of said means and the distance between said means for feeding and said cutter means while the machine is in operation.

11. In a machine of the character described, the combination of means for feeding material to be cut into shorter lengths, cutter means to which said material is fed, means for adjusting the distance between said means for feeding and said cutter means, means for driving said means for feeding and said cutter means, means for simultaneously adjusting the operating speed of one of said means and the distance between said means for feeding and said cutter means while the machine is in operation, and selectively operable means for disengaging said means for adjusting the distance between said means for feeding and said cutter means whereby the speed ratio between said cutter means and said means for feeding may be changed without changing the distance between said means for feeding and said cutter means.

12. In a machine of the character described, the combination of means for feeding material to be cut into shorter lengths, cutter means to which said material is fed, means for adjusting the distance between said means for feeding and said cutter means, means for driving said means for feeding and said cutter means, and means for simultaneously adjusting the operating speed of one of said means and the distance between said means for feeding and said cutter means while the machine is in operation.

13. In a machine of the character described, the combination of means for feeding material to be cut into shorter lengths, cutter means to which said material is fed, means for adjusting the distance between said means for feeding and said cutter means, means for driving said means for feeding and said cutter means, means for adjusting the relative operating speed of said means for feeding and said cutter means and simultaneously adjusting the distance between said means for feeding and said cutter means while the machine is in operation, and selectively operable means for disengaging said means for adjusting the distance between said means for feeding and said cutter means whereby the speed ratio between said cutter means and said means for feeding may be changed without changing the distance between said means for feeding and said cutter means.

14. In a machine of the character described, the combination of means for feeding material to be cut into shorter lengths, cutter means to which said material is fed, means for adjusting the distance between said means for feeding and said cutter means, means for driving said means for feeding and said cutter means, means for adjusting the relative operating speed of said means for feeding and said cutter means and simultaneously adjusting the distance between said means for feeding and said cutter means while the machine is in operation.

15. In a machine of the character described, the combination of means for feeding material to be cut into shorter lengths, cutter means to which said material is fed, means for adjusting the distance between said means for feeding and said cutter means, means for driving said means for feeding and said cutter means, means for adjusting the relative operating speed of said means for feeding and said cutter means and simultaneously adjusting the distance between said means for feeding and said cutter means.

ANDREW Y. CROWLEY, JR.
FLOYD C. NEWTON, JR.

REFERENCES CITED

The following references are of record in the file of this patent:

UNITED STATES PATENTS

| Number | Name | Date |
| --- | --- | --- |
| 465,427 | Cox | Dec. 15, 1891 |
| 487,621 | Hidden | Dec. 6, 1892 |
| 506,798 | Scott | Oct. 17, 1893 |
| 512,278 | Clement | Jan. 9, 1894 |